US012804589B2

(12) United States Patent
Payami et al.

(10) Patent No.: US 12,804,589 B2
(45) Date of Patent: Nov. 17, 2026

(54) OPTIMIZING USER EQUIPMENT LOCATIONS IN A BASE STATION TESTING SYSTEM

(71) Applicant: VIAVI Solutions Inc., Chandler, AZ (US)

(72) Inventors: Sohail Payami, Essex (GB); Ata Sattarzadeh Hashemi, Guildford (GB); Chi-ming Leung, Hardwick (GB); Stephen Wang, London (GB); Zunaira Babar, Hitchin (GB)

(73) Assignee: VIAVI Solutions Inc., Chandler, AZ (US)

( * ) Notice: Subject to any disclaimer, the term of this patent is extended or adjusted under 35 U.S.C. 154(b) by 183 days.

(21) Appl. No.: 18/824,356

(22) Filed: Sep. 4, 2024

(65) Prior Publication Data

US 2026/0067847 A1 Mar. 5, 2026

(51) Int. Cl.

*H04W 64/00* (2009.01)
*H04B 17/309* (2015.01)
*H04W 16/28* (2009.01)

(52) U.S. Cl.

CPC .......... *H04W 64/00* (2013.01); *H04B 17/346* (2023.05); *H04W 16/28* (2013.01)

(58) Field of Classification Search

CPC .... H04W 64/00; H04W 16/28; H04B 17/346; H04B 17/3912; H04B 17/252; H04B 17/253; H04B 17/15

See application file for complete search history.

(56) References Cited

U.S. PATENT DOCUMENTS

| | | | |
|---|---|---|---|
| 11,088,744 B1 | 8/2021 | Hammond et al. | |
| 2018/0115958 A1* | 4/2018 | Raghavan | H04B 7/026 |
| 2019/0386760 A1 | 12/2019 | Li et al. | |
| 2026/0066965 A1* | 3/2026 | Sattarzadeh Hashemi | H04B 7/0617 |
| 2026/0067186 A1* | 3/2026 | Sattarzadeh Hashemi | H04B 17/25 |

FOREIGN PATENT DOCUMENTS

| | | | |
|---|---|---|---|
| CN | 109547128 A | 3/2019 | |
| WO | WO-2024186235 A1 * | 9/2024 | G01S 13/878 |

OTHER PUBLICATIONS

Extended European Search Report for European Application No. EP25198790.5 dated Feb. 4, 2026, 19 pages.

* cited by examiner

*Primary Examiner* — Siu M Lee

(74) *Attorney, Agent, or Firm* — Harrity & Harrity, LLP

(57) ABSTRACT

A base station testing system includes a plurality of user equipments (UEs), a UE adjustment component, and one or more processors. The one or more processors determine respective initial locations of the plurality of UEs with respect to a base station and cause the UE adjustment component to move the plurality of UEs to the respective initial locations. The one or more processors determine one or more candidate locations of each UE with respect to the base station and cause the UE adjustment component to move each UE to the one or more candidate locations of the UE. The one or more processors then determine respective optimal locations of the plurality of UEs with respect to the base station and cause the UE adjustment component to move the plurality of UEs to the respective optimal locations.

20 Claims, 13 Drawing Sheets

200

200

OPTIMIZING USER EQUIPMENT LOCATIONS IN A BASE STATION TESTING SYSTEM

BACKGROUND

A base station may utilize a multi-user (MU) multiple-input multiple-output (MIMO) antenna system to support multiple data streams at the same time and frequency to multiple devices (e.g., user equipments).

SUMMARY

In some implementations, a base station testing system includes a plurality of user equipments (UEs); a UE adjustment component; and one or more processors configured to: determine respective initial locations of the plurality of UEs with respect to a base station; cause the UE adjustment component to move the plurality of UEs to the respective initial locations; determine, based on the respective initial locations of the plurality of UEs, one or more candidate locations of each UE with respect to the base station; cause the UE adjustment component to move each UE to the one or more candidate locations of the UE; determine, based on causing the UE adjustment component to move the plurality of UEs to the respective initial locations and based on causing the UE adjustment component to move each UE to the one or more candidate locations of the UE, respective optimal locations of the plurality of UEs with respect to the base station; and cause the UE adjustment component to move the plurality of UEs to the respective optimal locations.

In some implementations, a base station testing system includes a plurality of UEs; and one or more processors configured to: determine respective initial locations of the plurality of UEs with respect to a base station; cause the plurality of UEs to move to the respective initial locations; determine, based on the respective initial locations of the plurality of UEs, one or more candidate locations of each UE with respect to the base station; cause each UE to move to the one or more candidate locations of the UE; and determine, based on causing the plurality of UEs to move to the respective initial locations and based on causing each UE to move to the one or more candidate locations of the UE, respective optimal locations of the plurality of UEs with respect to the base station.

In some implementations, a method includes determining, by a base station testing system, respective initial locations of a plurality of UEs with respect to a base station; causing, by the base station testing system, the plurality of UEs to move to the respective initial locations; causing, by the base station testing system, each UE, of the plurality of UEs, to move to one or more candidate locations of the UE with respect to the base station; and determining, by the base station testing system, based on causing the plurality of UEs to move to the respective initial locations, and based on causing each UE to move to the one or more candidate locations of the UE, respective optimal locations of the plurality of UEs with respect to the base station.

DETAILED DESCRIPTION

Figure 1A:
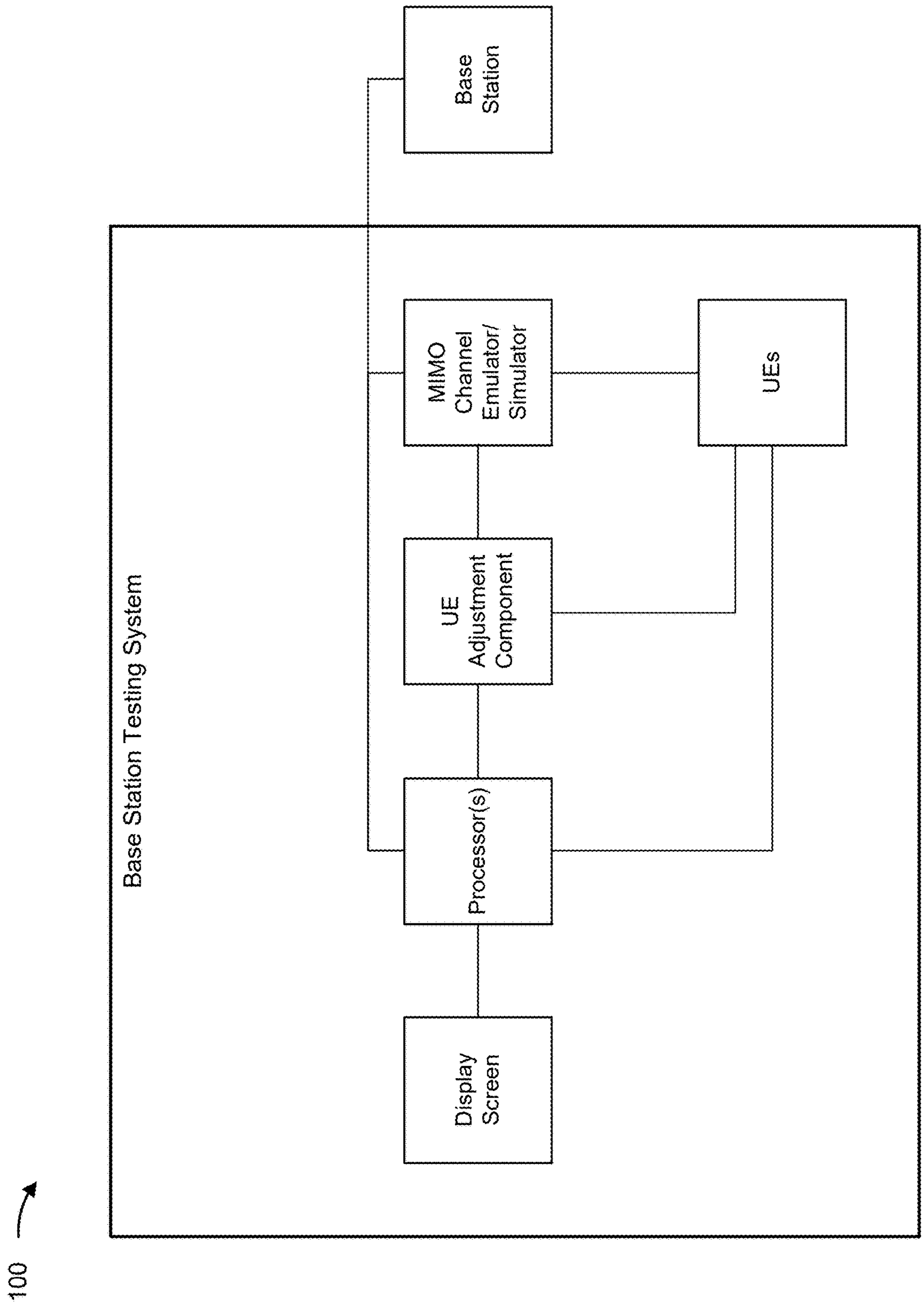
FIGS. 1A-1H are diagrams of an example implementation associated with optimizing UE locations in a base station testing system.

The following detailed description of example implementations refers to the accompanying drawings. The same reference numbers in different drawings may identify the same or similar elements.

A base station testing system can test, analyze, and/or troubleshoot a base station, such as an MU MIMO base station. In some cases, because radio propagation channels associated with the base station can impact a performance of the base station (e.g., with respect to one or more performance metrics associated with the base station), the base station testing system is required to create specific channel conditions to evaluate the base station (e.g., using a plurality of UEs of the base station testing system and a MIMO channel emulator and/or simulator of the base station testing system). For example, to test whether the base station can achieve a maximum throughput (e.g., that the base station is designed to provide), an operator (e.g., a test engineer) of the base station testing system must ensure a practical availability of propagation channels that support corresponding data rates. However, designing such propagation channels is a non-trivial task that is time consuming and requires extensive use of computing resources (e.g., processing resources, memory resources, communication resources, and/or power resources, among other examples). For example, because sources of impairments and errors are inherent in the base station testing system, it is often difficult to create propagation channels that meet testing requirements (e.g., because an open-loop, process of changing settings and characteristics of the base station testing system is required). Further, even when propagation channels that meet testing requirements are created, conditions associated with the base station testing system and the base station can change over time (e.g., due to a change in temperature, a replacement of a component of the base station testing system, and/or other reasons), which requires the propagation channels to be modified and/or new propagation channels to be created.

Some implementations described herein include a base station testing system to evaluate (e.g., test, analyze, and/or troubleshoot) a base station. The base station testing system includes a plurality of UEs (e.g., to communicate with the base station); a UE adjustment component (e.g., to move the plurality of UEs to and from respective locations); and one or more processors to control movement of the plurality of UEs. In some implementations, the one or more processors determine respective initial locations of the plurality of UEs with respect to the base station (e.g., using one or more open-loop techniques, which may be based on inter-UE interference between the plurality of UEs or beam patterns of the base station) and cause (e.g., by controlling the UE adjustment component) the plurality of UEs to move to the respective initial locations. The one or more processors then determine respective one or more candidate locations of the plurality of UEs with respect to the base station (e.g., based on the respective initial locations) and cause (e.g., by controlling the UE adjustment component) the plurality of UEs to move to the respective one or more candidate locations. Accordingly, the one or more processors determine (e.g., based on based on performance information obtained from at least one of the base station or the plurality of UEs, in association with the plurality of UEs being located in the respective initial locations and the respective one or more candidate location) respective optimal locations of the plurality of UEs with respect to the base station.

The respective optimal locations of the plurality of UEs may provide an optimal performance of the base station. For example, when the plurality of UEs are located at the respective optimal locations, a performance metric (e.g., a signal quality metric, a data performance metric, or another type of performance metric) associated with the base station may satisfy a performance metric threshold. As a specific example, when the plurality of UEs are located at the respective optimal locations, a throughput metric associated with the base station may satisfy (e.g., may be greater than or equal to) a throughput metric threshold. Accordingly, in some implementations, the one or more processors cause (e.g., by controlling the UE adjustment component) the plurality of UEs to move to the respective optimal locations (e.g., to enable optimal testing of the base station).

In this way, some implementations facilitate optimizing propagation channel conditions in a base station testing system by automatically (e.g., using a closed-loop technique) optimizing UE locations in the base station. This enables optimal testing of the base station. Further, an operator (e.g., a test engineer) of the base station testing system does not need specific knowledge of the base station testing system and the base station (e.g., such as information concerning beams associated with the plurality of UEs and the base station, precoder information associated with the base station, and equalizer information associated with the base station) because the base station testing system automatically identifies and moves the plurality of UEs to the respective optimal locations based on performance feedback provided by the plurality of UEs and the base station.

Further, because some implementations enable an automated process, an amount of time to create propagation channels that meet testing requirements of the base station testing system is reduced, and use of computing resources (e.g., processing resources, memory resources, communication resources, and/or power resources, among other examples) that would otherwise be used to determine theoretical preferred conditions to create the propagation channels is also reduced (and, in some cases, eliminated). Additionally, some implementations allow for modified or new respective optimal locations of the plurality of UEs to be automatically determined, which facilitates testing of the base station using the base station testing system even when conditions associated with the base station testing system and the base station change over time (e.g., due to a change in temperature, a replacement of a component of the base station testing system, and/or other reasons).

FIGS. 1A-1H are diagrams of an example implementation 100 associated with optimizing UE locations in a base station testing system. As shown in FIGS. 1A-1H, example implementation 100 includes a base station testing system and a base station. These devices are described in more detail below in connection with FIG. 3 and FIG. 4.

As shown in FIG. 1A, the base station testing system may include a display screen, one or more processors, a UE adjustment component, a MIMO channel emulator and/or simulator (referred to hereinafter as the MIMO channel emulator/simulator), and/or a plurality of UEs. The display screen may be configured to display information (e.g., to an operator of the base station testing system), such as information associated with testing of the base station (e.g., as further described herein). The one or more processors may be configured to control one or more components of the base station testing system, such as the display screen, the UE adjustment component, the MIMO channel emulator/simulator, and/or the plurality of UEs (e.g., as further described herein). In some implementations, the one or more processors may be configured to control the base station (e.g., as further described herein). The UE adjustment component may be configured to move the plurality of UEs (e.g., from respective first positions to respective second positions, as further described herein). The MIMO channel emulator/simulator may be configured to emulate complex and dynamic real-world wireless channels for communications (e.g., of signals) between the plurality of UEs and the base station. The plurality of UEs may include wireless communication devices and/or emulated UEs (e.g., as emulated by the MIMO channel emulator/simulator, or by a UE emulator that is included in, or, alternatively, is separate from, the MIMO channel emulator/simulator) that are capable of communicating with the base station (e.g., as further described herein).

As further shown in FIG. 1A, the base station testing system may connect to the base station. For example, the one or more processors and/or the MIMO channel emulator/simulator may connect to the base station. The base station may be, for example, an MU MIMO base station, such as a next-generation node B (gNodeB) base station.

FIGS. 1B-1H shown example operations that may be performed by a base station testing system (and/or particular components of the base station testing system) to optimize locations of the plurality of UEs, such as to facilitate testing of the base station.

Figure 1B:
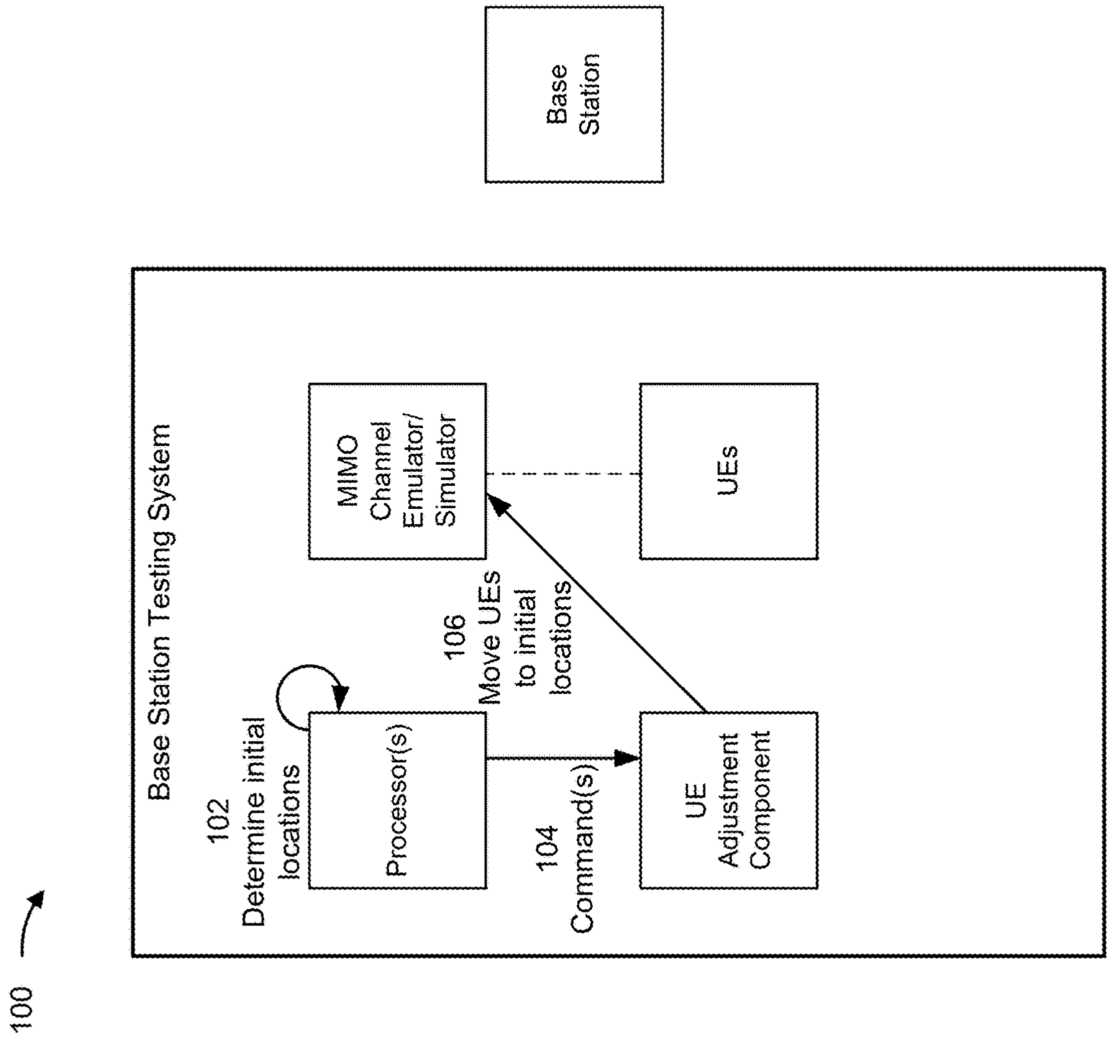

As shown in FIG. 1B, and by reference number 102, the one or more processors may determine respective initial locations of the plurality of UEs (e.g., with respect to the base station). That is, the one or more processors may determine, for each UE, of the plurality of UEs, an initial location of the UE with respect to the base station (e.g., an initial two-dimensional (2D) coordinate location of the UE relative to the base station, which is located at an origin).

The one or more processors may determine the respective initial locations of the plurality of UEs using one or more techniques (also referred to as one or more open-loop techniques). In some implementations, the one or more processors may determine the respective initial locations of the plurality of UEs based on inter-UE interference between the plurality of UEs. For example, the one or more processors may determine (e.g., as the respective initial locations) respective locations of the plurality of UEs that reduce inter-UE interference between the plurality of UEs (e.g., that reduce an aggregated inter-UE interference between the plurality of UEs, that reduce a maximum inter-UE interference between the plurality of UEs, among other examples). Additionally, or alternatively, the one or more processors may determine the respective initial locations of the plurality of UEs based on beam patterns of the base station and/or signal-to-interference-plus-noise ratios (SINRs) associated with the plurality of UEs. For example, the one or more processors may determine (e.g., as the respective initial locations) respective locations of the plurality of UEs that maximize a gain of a beam for each UE and/or maximize an SINR for the UE (e.g., for one or more layers).

As shown by reference number 104, the one or more processors may transmit one or more commands to the UE adjustment component (e.g., based on determining the respective initial locations of the plurality of UEs). The one or more commands may indicate that the UE adjustment component is to move the plurality of UEs to (or to cause the plurality of UEs to remain at) the respective initial locations. The one or more processors may transmit the one or more commands to the UE adjustment component via a connection between the one or more processors and the UE adjustment component, and therefore the UE adjustment component may receive the one or more commands from the one or more processors via the connection.

Accordingly, as shown by reference number 106, the UE adjustment component may move the plurality of UEs (e.g., based on the one or more commands). For example, the UE adjustment component may cause the plurality of UEs to move to the respective initial locations (or to remain at the respective initial locations, when already located at the respective initial locations). In some implementations, to move the plurality of UEs, the UE adjustment component may communicate with the MIMO channel emulator/simulator to cause the plurality of UEs to move to the respective initial locations. That is, the UE adjustment component may communicate with the MIMO channel emulator/simulator to cause the MIMO channel emulator/simulator to emulate, simulate, or otherwise represent the respective initial locations of the plurality of UEs (e.g., by adjusting one or more parameters associated with the MIMO channel emulator/simulator and/or the plurality of UEs), which thereby causes the plurality of UEs to move to the respective initial locations.

In this way, the one or more processors may cause the plurality of UEs to move to the respective initial locations (e.g., by transmitting the one or more commands to the UE adjustment component, which causes the UE adjustment component to move the plurality of UEs to the respective initial locations).

Figure 1C:
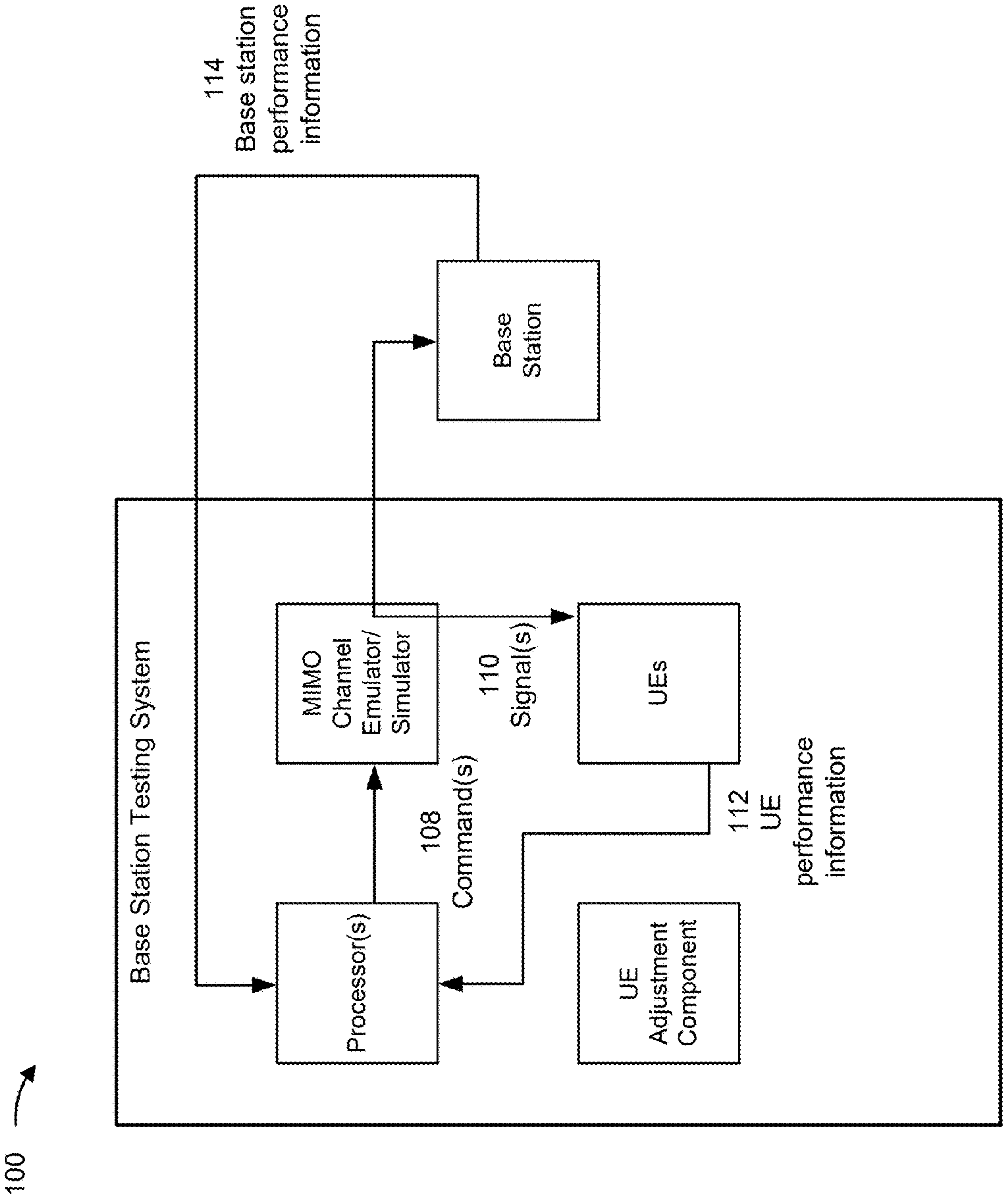

As shown in FIG. 1C, and by reference number 108, the one or more processors may transmit one or more commands to the MIMO channel emulator/simulator (e.g., based on causing the plurality of UEs to move to the respective initial locations). The one or more commands may indicate that base station is to be tested (e.g., with the plurality of UEs in the respective initial locations) and/or that the base station and the plurality of UEs are to communicate signals (e.g., via the MIMO channel emulator/simulator). The one or more processors may transmit the one or more commands to the MIMO channel emulator/simulator via a connection between the one or more processors and the MIMO channel emulator/simulator, and therefore the MIMO channel emulator/simulator may receive the one or more commands from the one or more processors via the connection.

Accordingly, as shown by reference number 110, the base station and the plurality of UEs may communicate (e.g., based on the one or more commands). For example, the base station and the plurality of UEs may communicate signals (e.g., via the MIMO channel emulator/simulator), such as to facilitate testing of the base station.

As shown by reference number 112, the plurality of UEs may transmit UE performance information to the one or more processors (e.g., based on communicating with the base station). The UE performance information may indicate, for each UE, performance metrics, such as signal quality metrics (e.g., SINR metrics, received signal strength indicator (RSSI) metrics, reference signal received power (RSRP) metrics, and/or reference signal received quality (RSRQ) metrics, among other examples), data performance metrics (e.g., throughput metrics, latency metrics, packet loss metrics, bit error rate (BER) metrics, and/or block error rate (BLER) metrics, among other examples), and/or other types of performance metrics. The plurality of UEs may transmit the UE performance information to the one or more processors via connections between the one or more processors and the plurality of UEs, and therefore the one or more processors may receive the UE performance information from the plurality of UEs via the connections.

As shown by reference number 114, the base station may transmit base station performance information to the one or more processors (e.g., based on communicating with the plurality of UEs). The base station performance information may indicate, for the base station (e.g., with respect to individual UEs, or the plurality of UEs, and/or with respect to the plurality of UEs, collectively), performance metrics, such as signal quality metrics (e.g., SINR metrics, RSSI metrics, RSRP metrics, and/or RSRQ metrics, among other examples), data performance metrics (e.g., throughput metrics, latency metrics, packet loss metrics, BER metrics, and/or BLER metrics, among other examples), and/or other types of performance metrics. The base station may transmit the base station performance information to the one or more processors via a connection between the one or more processors and the base station, and therefore the one or more processors may receive the base station performance information from the base station via the connection.

In this way, the one or more processors may obtain performance information from at least one of the base station or the plurality of UEs. The one or more processors may use the performance information to determine respective optimal locations of the plurality of UEs (e.g., with respect to the base station), as further described herein.

Figure 1D:
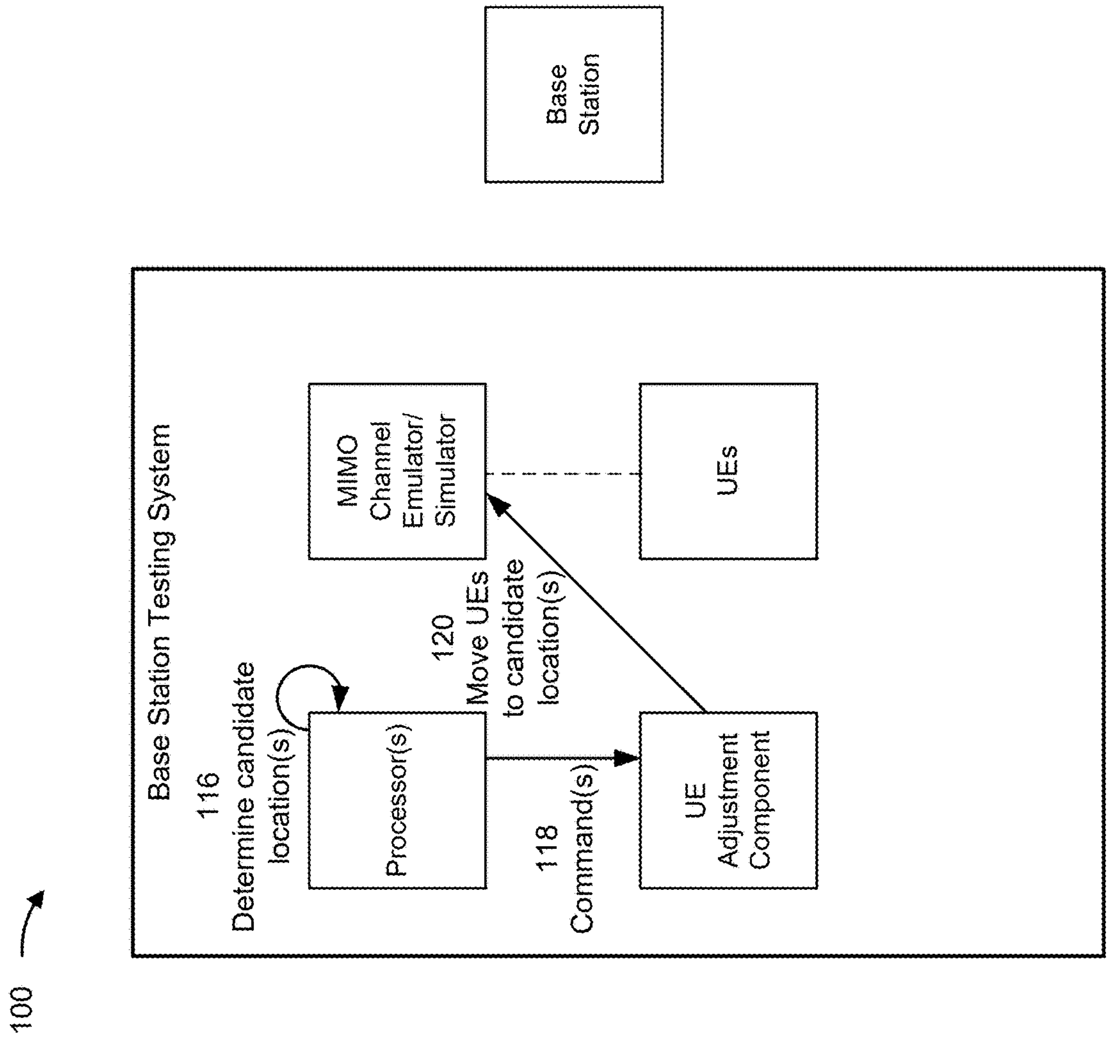

As shown in FIG. 1D, and by reference number 116, the one or more processors may determine respective one or more candidate locations of the plurality of UEs (e.g., with respect to the base station). That is, the one or more processors may determine, for each UE, of the plurality of UEs, one or more candidate locations of the UE with respect to the base station (e.g., one or more candidate 2D coordinate locations of the UE relative to the base station, which is located at an origin). The one or more processors may determine the one or more candidate locations of each UE based on the respective initial locations of the plurality of UEs. For example, the one or more processors may identify an initial location of a UE and may determine one or more candidate locations of the UE that are within a threshold distance of the initial location.

As shown by reference number 118, the one or more processors may transmit one or more commands to the UE adjustment component (e.g., based on determining the respective one or more candidate locations of the plurality of UEs). The one or more commands may indicate that the UE adjustment component is to move the plurality of UEs to the respective one or more candidate locations. The one or more processors may transmit the one or more commands to the UE adjustment component via the connection between the one or more processors and the UE adjustment component, and therefore the UE adjustment component may receive the one or more commands from the one or more processors via the connection.

Accordingly, as shown by reference number 120, the UE adjustment component may move the plurality of UEs (e.g., based on the one or more commands). For example, the UE adjustment component may cause the plurality of UEs to move to the respective one or more candidate locations. That is, the UE adjustment component may move each UE to the one or more candidate locations of the UE. In some implementations, to move the plurality of UEs, the UE adjustment component may communicate with the MIMO channel emulator/simulator to cause the plurality of UEs to move to the respective one or more candidate locations. That is, the UE adjustment component may communicate with the MIMO channel emulator/simulator to cause the MIMO channel emulator/simulator to emulate, simulate, or otherwise represent the respective one or more candidate locations of the plurality of UEs (e.g., by adjusting one or more parameters associated with the MIMO channel emulator/simulator and/or the plurality of UEs), which thereby causes the plurality of UEs to move to the respective one or more candidate locations. In some implementations, the UE adjustment component may serially move each UE to the one or more candidate locations of the UE, such that the UE adjustment component moves the UE to a first candidate location of the one or more candidate locations, then moves the UE to a second candidate location of the one or more candidate locations, and so on.

In this way, the one or more processors may cause the plurality of UEs to move to the respective one or more candidate locations (e.g., by transmitting the one or more commands to the UE adjustment component, which causes the UE adjustment component to move the plurality of UEs to the respective one or more candidate locations).

Figure 1E:
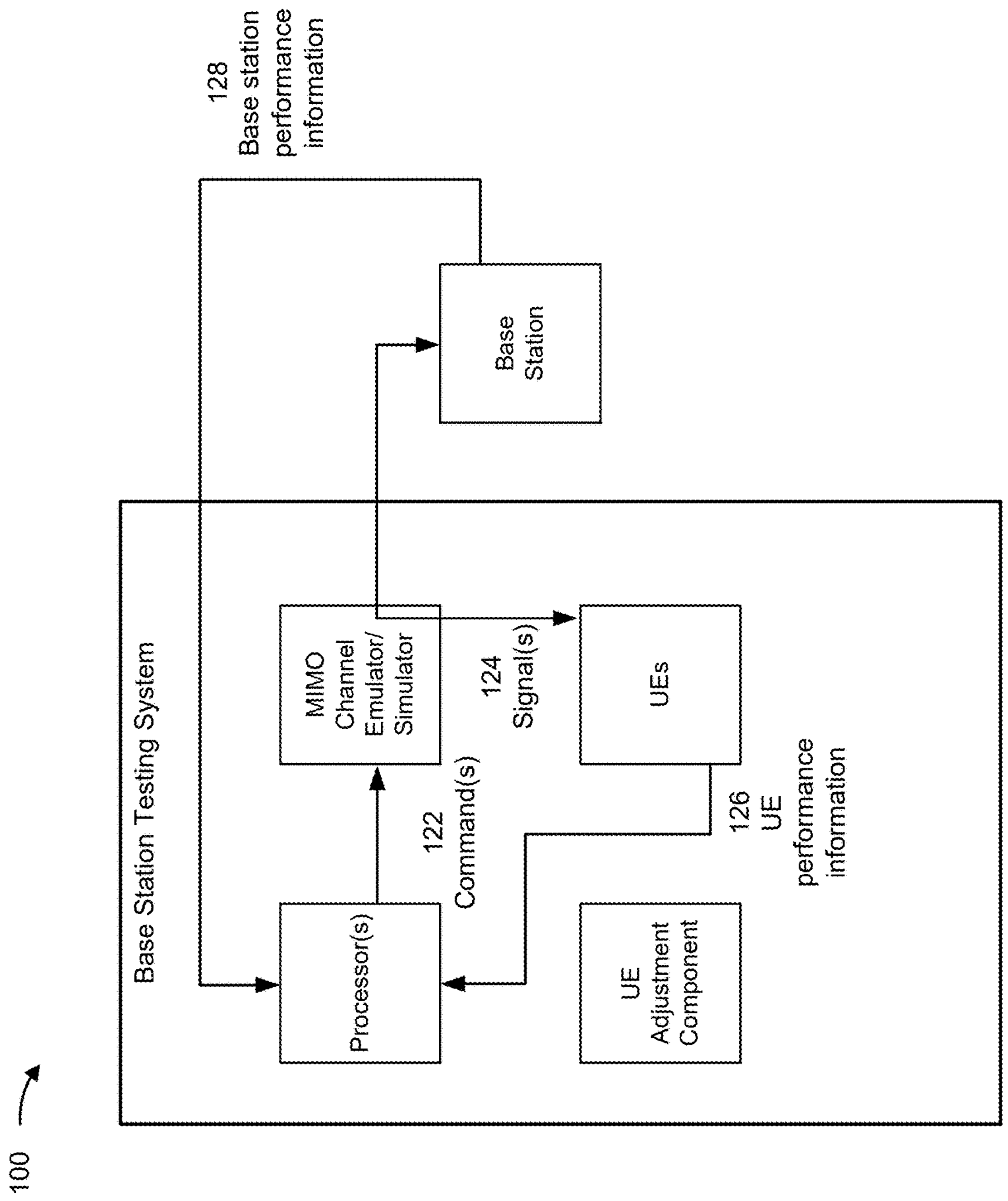

As shown in FIG. 1E, and by reference number 122, the one or more processors may transmit one or more commands to the MIMO channel emulator/simulator (e.g., based on causing the plurality of UEs to move to the respective one or more candidate locations). The one or more commands may indicate that base station is to be tested (e.g., with the plurality of UEs in the respective one or more candidate locations) and/or that the base station and the plurality of UEs are to communicate signals (e.g., via the MIMO channel emulator/simulator). The one or more processors may transmit the one or more commands to the MIMO channel emulator/simulator via a connection between the one or more processors and the MIMO channel emulator/simulator, and therefore the MIMO channel emulator/simulator may receive the one or more commands from the one or more processors via the connection.

Accordingly, as shown by reference number 124, the base station and the plurality of UEs may communicate (e.g., based on the one or more commands). For example, the base station and the plurality of UEs may communicate signals (e.g., via the MIMO channel emulator/simulator), such as to facilitate testing of the base station. The base station and the plurality of UEs may communicate signals when each UE is located at the one or more candidate locations of the UE.

As shown by reference number 126, the plurality of UEs may transmit UE performance information to the one or more processors (e.g., based on communicating with the base station). The UE performance information may indicate, for each UE, performance metrics, such as signal quality metrics (e.g., SINR metrics, RSSI metrics, RSRP metrics, and/or RSRQ metrics, among other examples), data performance metrics (e.g., throughput metrics, latency metrics, packet loss metrics, BER metrics, and/or BLER metrics, among other examples), and/or other types of performance metrics. The UE performance information may indicate, for each UE, performance metrics associated with each candidate location of the one or more candidate locations of the UE (e.g., performance metrics when the UE is located at each candidate location). The plurality of UEs may transmit the UE performance information to the one or more processors via the connection between the one or more processors and the plurality of UEs, and therefore the one or more processors may receive the UE performance information from the plurality of UEs via the connection.

As shown by reference number 128, the base station may transmit base station performance information to the one or more processors (e.g., based on communicating with the plurality of UEs). The base station performance information may indicate, for the base station (e.g., with respect to individual UEs, or the plurality of UEs, and/or with respect to the plurality of UEs, collectively), performance metrics, such as signal quality metrics (e.g., SINR metrics, RSSI metrics, RSRP metrics, and/or RSRQ metrics, among other examples), data performance metrics (e.g., throughput metrics, latency metrics, packet loss metrics, BER metrics, and/or BLER metrics, among other examples), and/or other types of performance metrics. The base station performance information may indicate performance metrics associated with the respective one or more candidate locations of the plurality of UEs (e.g., individual performance metrics for each candidate location of each UE). The base station may transmit the base station performance information to the one or more processors via the connection between the one or more processors and the base station, and therefore the one or more processors may receive the base station performance information from the base station via the connection.

In this way, the one or more processors may obtain performance information from at least one of the base station or the plurality of UEs. The base station may use the performance information to determine respective optimal locations of the plurality of UEs (e.g., with respect to the base station), as further described herein.

Figure 1F:
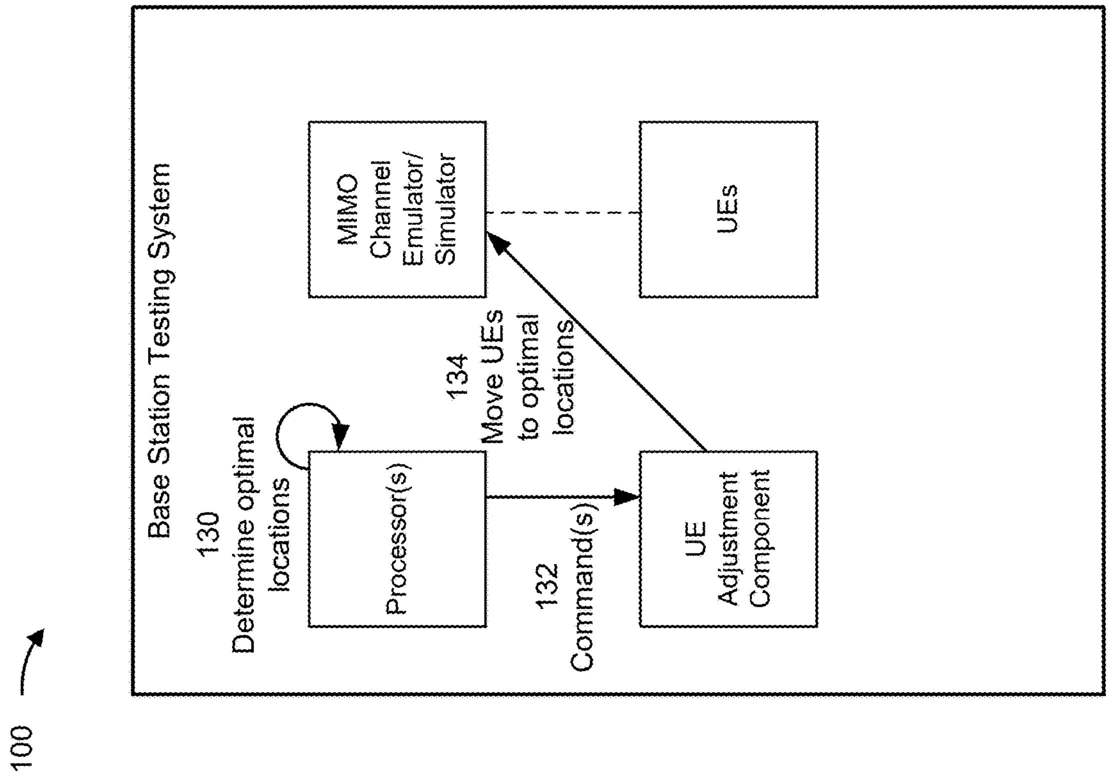

As shown in FIG. 1F, and by reference number 130, the one or more processors may determine respective optimal locations of the plurality of UEs (e.g., with respect to the base station). That is, the one or more processors may determine, for each UE, of the plurality of UEs, an optimal location of the UE with respect to the base station (e.g., an initial 2D coordinate location of the UE relative to the base station, which is located at an origin). The respective optimal locations of the plurality of UEs may provide an optimal performance of the base station. For example, when the plurality of UEs are located at the respective optimal locations, a performance metric (e.g., a signal quality metric, a data performance metric, or another type of performance metric) associated with the base station may satisfy a performance metric threshold. As a specific example, when the plurality of UEs are located at the respective optimal locations, a throughput metric associated with the base station may satisfy (e.g., may be greater than or equal to) a throughput metric threshold.

The one or more processors may determine the respective optimal locations of the plurality of UEs using one or more techniques (also referred to as one or more closed-loop techniques). In some implementations, the one or more processors may obtain, based on causing the UE adjustment component to move the plurality of UEs to the respective initial locations and/or based on causing the UE adjustment component to move each UE to the one or more candidate locations of the UE (e.g., as described herein), performance information from at least one of the base station or the plurality of UEs (e.g., may obtain base station performance information and/or UE performance information, as described herein). Accordingly, the one or more processors may determine the respective optimal locations of the plurality of UEs based on the performance information.

For example, the one or more processors may determine, based on causing the plurality of UEs to move to respective particular locations with respect to the base station (e.g., based on causing the UE adjustment component to move the plurality of UEs to the respective initial locations and based on causing the UE adjustment component to move each UE to the one or more candidate locations of the UE, as described herein), a performance metric associated with the base station (e.g., based the performance information from at least one of the base station or the plurality of UEs). That is, the one or more processors may determine the performance metric when the plurality of UEs are located in the respective particular locations. Accordingly, the one or more processors may determine that the performance metric satisfies a performance metric threshold and may thereby identify the respective particular locations as the respective optimal locations of the plurality of UEs. As a specific example, the one or more processors may determine a throughput metric associated with the base station when the plurality of UEs are located in respective particular locations, may determine that the throughput metric satisfies (e.g., is greater than or equal to) a throughput metric threshold (e.g., for the base station), and may thereby identify the respective particular locations as the respective optimal locations of the plurality of UEs.

As shown by reference number 132, the one or more processors may transmit one or more commands to the UE adjustment component (e.g., based on determining the respective optimal locations of the plurality of UEs). The one or more commands may indicate the UE adjustment component is to move the plurality of UEs to (or to cause the plurality of UEs to remain at) the respective optimal locations. The one or more processors may transmit the one or more commands to the UE adjustment component via the connection between the one or more processors and the UE adjustment component, and therefore the UE adjustment component may receive the one or more commands from the one or more processors via the connection.

Accordingly, as shown by reference number 134, the UE adjustment component may move the plurality of UEs (e.g., based on the one or more commands). For example, the UE adjustment component may cause the plurality of UEs to move to the respective optimal locations (or to remain at the respective optimal locations, when already located at the respective optimal locations). In some implementations, to move the plurality of UEs, the UE adjustment component may communicate with the MIMO channel emulator/simulator to cause the plurality of UEs to move to the respective optimal locations. That is, the UE adjustment component may communicate with the MIMO channel emulator/simulator to cause the MIMO channel emulator/simulator to emulate, simulate, or otherwise represent the respective optimal locations of the plurality of UEs (e.g., by adjusting one or more parameters associated with the MIMO channel emulator/simulator and/or the plurality of UEs), which thereby causes the plurality of UEs to move to the respective optimal locations.

In this way, the one or more processors may cause the plurality of UEs to move to the respective optimal locations (e.g., by transmitting the one or more commands to the UE adjustment component, which causes the UE adjustment component to move the plurality of UEs to the respective optimal locations). The one or more processors therefore cause the plurality of UEs to move to the respective optimal locations to enable testing (e.g., optimal testing) of the base station.

Figure 1G:
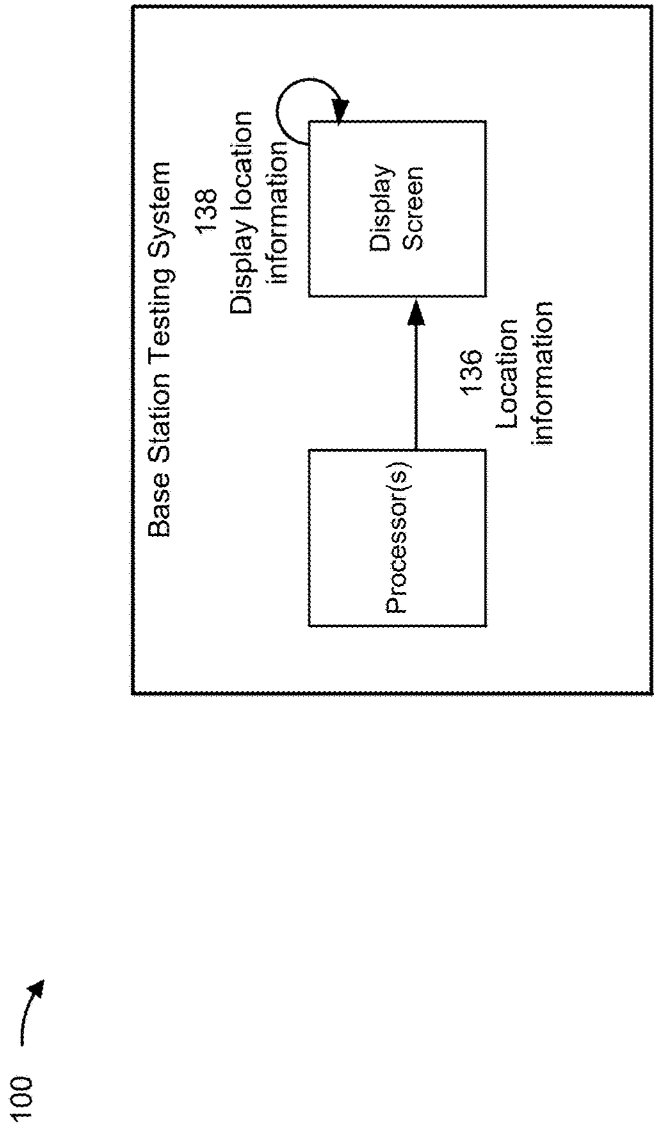

As shown in FIG. 1G, and by reference number 136, the one or more processors may transmit location information. The location information may be associated with at least one of the respective initial locations of the plurality of UEs, the one or more candidate locations of each UE, or the respective optimal locations of the plurality of UEs. That is, the location information may indicate the respective initial locations of the plurality of UEs, the one or more candidate locations of each UE, and/or the respective optimal locations of the plurality of UEs. Transmitting the location information allows at least some of the location information to be displayed (e.g., on a display screen, such as the display screen of the base station testing system). For example, the one or more processors may transmit the location information to the display screen of the base station testing system. The one or more processors may transmit the location information to the display screen via a connection between the one or more processors and the display screen, and therefore the display screen may receive the location information from the one or more processors via the connection.

Accordingly, as shown by reference number 138, the display screen may display at least some of the location information (e.g., to allow viewing of at least some of the location information by an operator of the base station testing system). In this way, the one or more processors may transmit the location information (e.g., to the display screen) to cause the display screen to display at least some of the location information (and therefore inform the operator of the base station testing system about at least some of the location information).

Figure 1H:
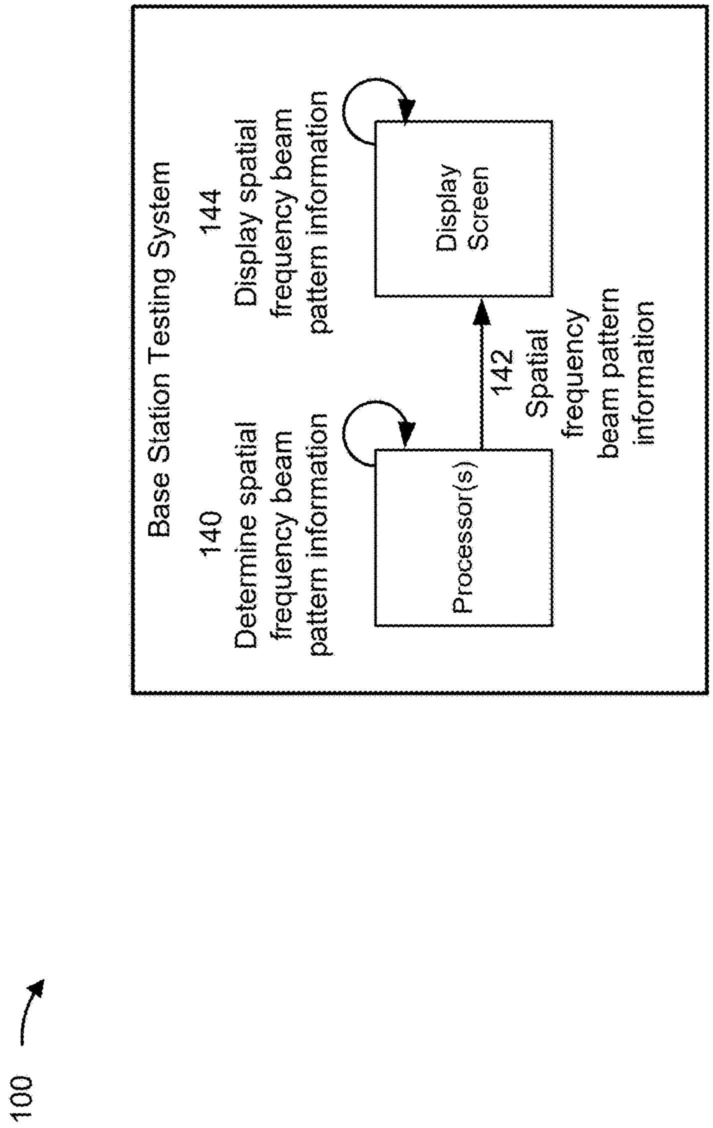

As shown in FIG. 1H, and by reference number 140, the one or more processors may determine angle domain beam pattern information associated with the base station (e.g., that indicates how the base station distributes energy, represented as a function of an angle relative to an antenna array of the base station). For example, the one or more processors may determine the angle domain beam pattern information based on information obtained from the base station (e.g., the base station performance information obtained from the base station, or other information obtained from the base station). Accordingly, the one or more processors may determine, based on the angle domain beam pattern information, spatial frequency domain beam pattern information associated with the base station (e.g., that indicates how the antenna array of the base station distributes energy across different spatial frequencies). For example, the one or more processors may process angle domain beam pattern information (e.g., using one or more processing techniques, such as a technique that utilizes a discrete Fourier transform (DFT)), to determine the spatial frequency domain beam pattern information.

As shown by reference number 142, the one or more processors may transmit the spatial frequency domain beam pattern information. Transmitting the spatial frequency domain beam pattern information allows at least some of the spatial frequency domain beam pattern information to be displayed (e.g., on a display screen, such as the display screen of the base station testing system). For example, the one or more processors may transmit the spatial frequency domain beam pattern information to the display screen of the base station testing system. The one or more processors may transmit the spatial frequency domain beam pattern information to the display screen via the connection between the one or more processors and the display screen, and therefore the display screen may receive the location information from the one or more processors via the connection.

Accordingly, as shown by reference number 144, the display screen may display at least some of the spatial frequency domain beam pattern information (e.g., to allow viewing of at least some of the spatial frequency domain beam pattern information by an operator of the base station testing system). In this way, the one or more processors may transmit the spatial frequency domain beam pattern information (e.g., to the display screen) to cause the display screen to display at least some of the spatial frequency domain beam pattern information (and therefore inform the operator of the base station testing system about at least some of the spatial frequency domain beam pattern information).

In some implementations, the display screen may display at least some of the spatial frequency domain beam pattern information in association with the at least some of the location information (e.g., concurrently). In this way, the display screen may display at least some locations of the plurality of UEs with respect to spatial frequency patterns of the base station, as further described herein in relation to FIG. 2.

As indicated above, FIGS. 1A-1H are provided as an example. Other examples may differ from what is described with regard to FIGS. 1A-1H. The number and arrangement of devices shown in FIGS. 1A-1H are provided as an example. In practice, there may be additional devices, fewer devices, different devices, or differently arranged devices than those shown in FIGS. 1A-1H. Furthermore, two or more devices shown in FIGS. 1A-1H may be implemented within a single device, or a single device shown in FIGS. 1A-1H may be implemented as multiple, distributed devices. Additionally, or alternatively, a set of devices (e.g., one or more devices) shown in FIGS. 1A-1H may perform one or more functions described as being performed by another set of devices shown in FIGS. 1A-1H.

Figure 2A:
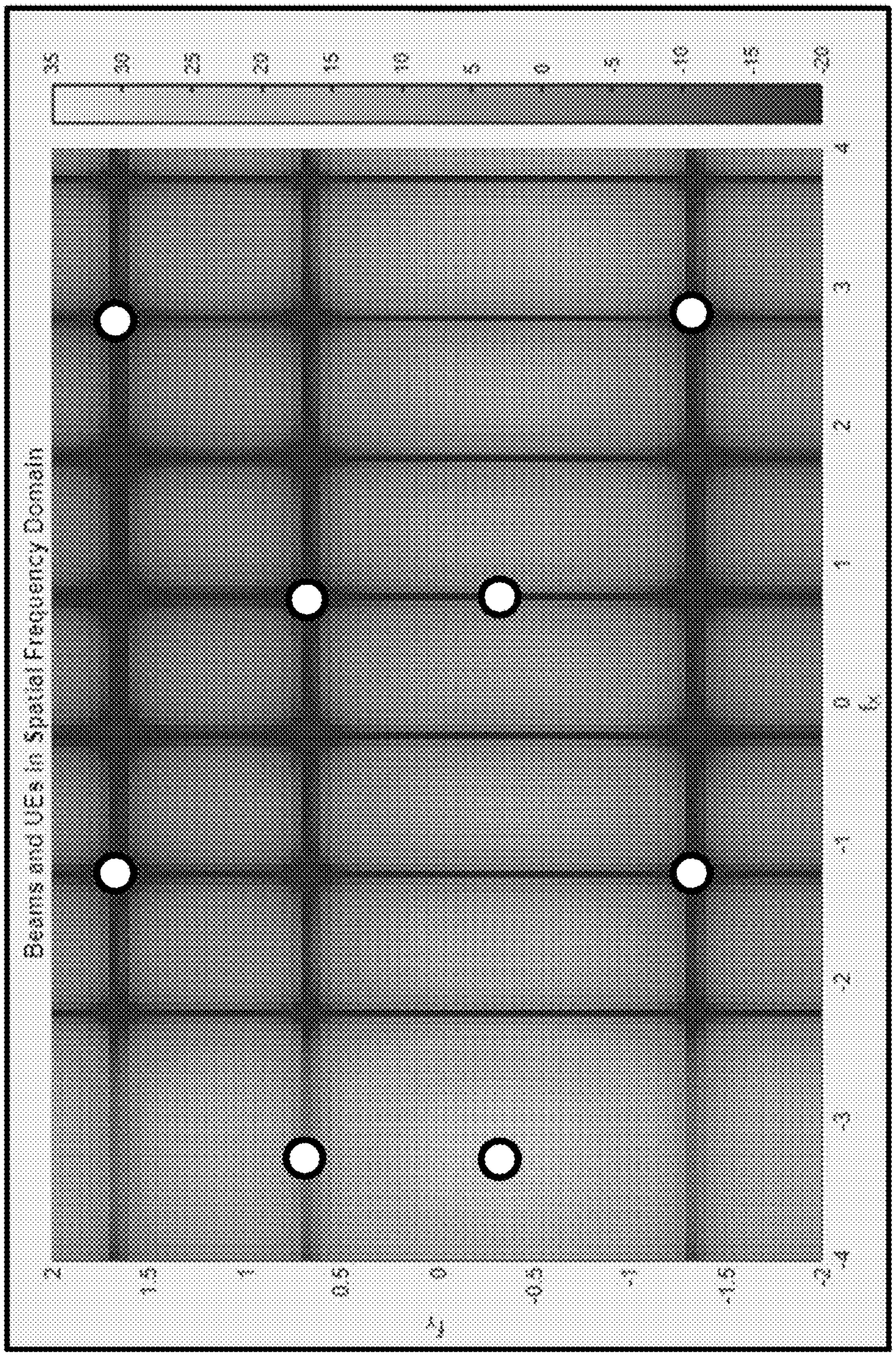
FIGS. 2A-2B are example diagrams associated with a display screen of a base station testing system displaying information.
Figure 2B:
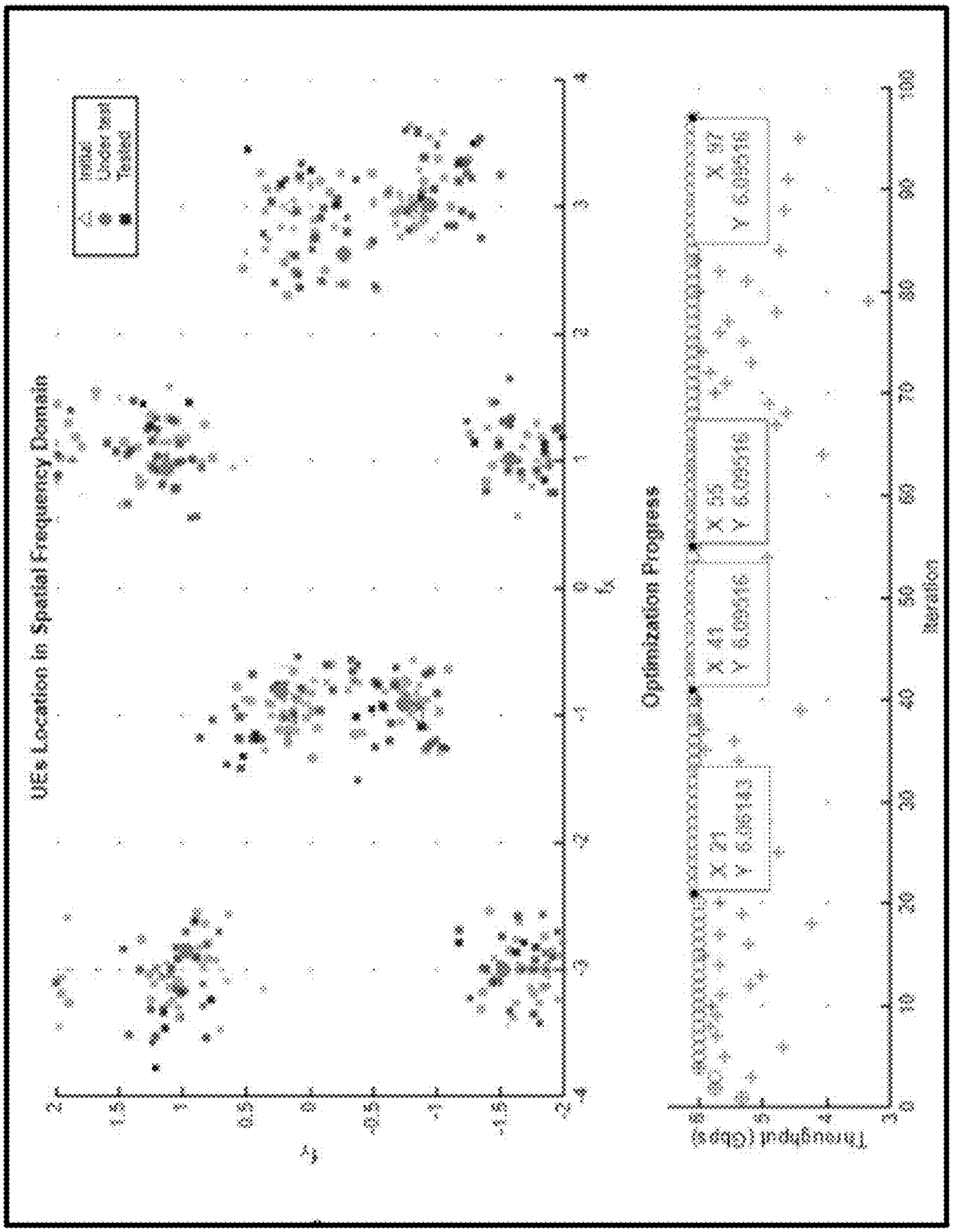

FIGS. 2A-2B show example diagrams 200 associated with the display screen of the base station testing system displaying information (e.g., via a user interface, such as a graphical user interface), as described herein in relation to FIGS. 1A-1H.

FIG. 2A shows an example of displaying location information (e.g., that indicates respective initial locations of the plurality of UEs, one or more candidate locations of each UE, and/or the respective optimal locations of the plurality of UEs, as described herein in relation to FIGS. 1A-1H) in association with displaying spatial frequency domain beam pattern information associated with a base station (e.g., that indicates how the antenna array of the base station distributes energy across different spatial frequencies). For example, the display screen may display the spatial frequency domain beam pattern information (e.g., using a black-to-white gradient) as a 2D rectilinear (or nearly rectilinear) grid of beam patterns, and may display the location information (e.g., that includes respective optimal locations of the plurality of UEs) as individual circles on (e.g., overlayed on) the 2D rectilinear of beam patterns.

FIG. 2B shows an example of displaying location information (e.g., that indicates respective initial locations of the plurality of UEs, one or more candidate locations of each UE, and/or the respective optimal locations of the plurality of UEs, as described herein in relation to FIGS. 1A-1H). For example, the display screen may display, on a 2D plot, respective initial locations of the plurality of UEs as triangles and one or more respective candidate locations of each UE as circles.

In some implementations, the display screen may additionally, or alternatively, display information related to performance information obtained from at least one of the base station or the plurality of UEs (e.g., base station performance information and/or UE performance information, as described herein in relation to FIGS. 1A-1H). For example, as shown in FIG. 2B, the display screen may display (e.g., as a plus (+)) a performance metric associated with the base station (e.g., a throughput metric associated with the base station) associated with each combination (shown as individual iterations) of respective positions of the plurality of UEs (e.g., based on the base station testing system iteratively moving each UE to the one or more candidate locations of the UE, as described herein in relation to FIGS. 1A-1H). The display screen may also display (e.g., as a circle) a maximum value of the performance metric for the combinations of respective positions of the plurality of UEs tried up to that point (e.g., a maximum value for iterations 1 through X−1, for the $X^{th}$ iteration).

As indicated above, FIGS. 2A-2B are provided as an example. Other examples may differ from what is described with regard to FIGS. 2A-2B.

Figure 3:
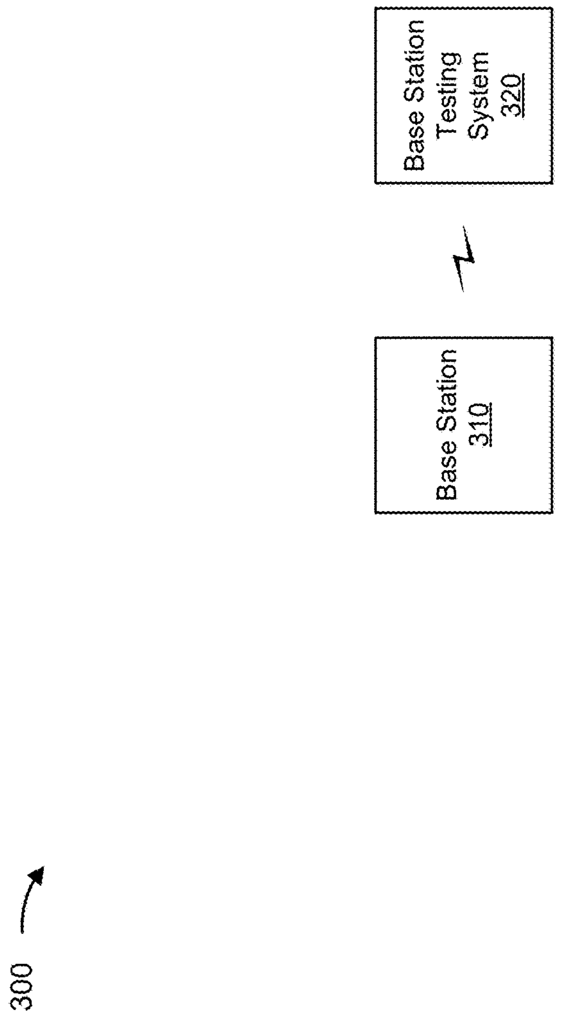
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a base station 310 and a base station testing system 320. Devices of environment 300 may interconnect via wired connections, wireless connections, or a combination of wired and wireless connections.

Base station 310 includes one or more devices capable of communicating with a UE using a cellular radio access technology (RAT). For example, base station 310 may include a base transceiver station, a radio base station, a node B, an evolved node B (eNodeB), a gNodeB, a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device. Base station 310 may transfer traffic between a UE (e.g., using a cellular RAT), other base stations 310 (e.g., using a wireless interface or a backhaul interface, such as a wired backhaul interface). Base station 310 may provide one or more cells that cover geographic areas. Some base stations 310 may be mobile base stations. Some base stations 310 may be capable of communicating using multiple RATs.

In some implementations, base station 310 may perform scheduling and/or resource management for UEs covered by base station 310 (e.g., UEs covered by a cell provided by base station 310). In some implementations, base stations 310 may be controlled or coordinated by a network controller, which may perform load balancing, network-level configuration, and/or the like. The network controller may communicate with base stations 310 via a wireless or wireline backhaul. In some implementations, base station 310 may include a network controller, a self-organizing network (SON) module or component, or a similar module or component. In other words, a base station 310 may perform network control, scheduling, and/or network management functions (e.g., for other base stations 310 and/or for uplink, downlink, and/or sidelink communications of UEs covered by the base station 310). In some implementations, base station 310 may include a central unit and multiple distributed units. The central unit may coordinate access control and communication with regard to the multiple distributed units. The multiple distributed units may provide UEs and/or other base stations 310 with access to a network.

In some implementations, base station 310 may be capable of MU MIMO communication. In a testing scenario, one or more antenna elements (e.g., an antenna array) of base station 310 may be disconnected, and base station 310 may be connected to the base station testing system 320 via one or more antenna ports of base station 310.

Base station testing system 320 includes a plurality of devices, such as a plurality of UEs, capable of communicating with base station 310, such as to perform one or more testing operations associated with base station 310. Base station testing system 320 may include one or more devices capable of receiving, generating, storing, processing, and/or providing information associated with optimizing UE locations (e.g., in the base station testing system 320). For example, base station testing system 320 may include a communication and/or computing device, such as a mobile phone (e.g., a smart phone, a radiotelephone, etc.), a laptop computer, a tablet computer, a handheld computer, a desktop computer, a wearable communication device (e.g., a smart wristwatch, a pair of smart eyeglasses, etc.), or a similar type of device.

The quantity and arrangement of devices and networks shown in FIG. 3 are provided as one or more examples. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
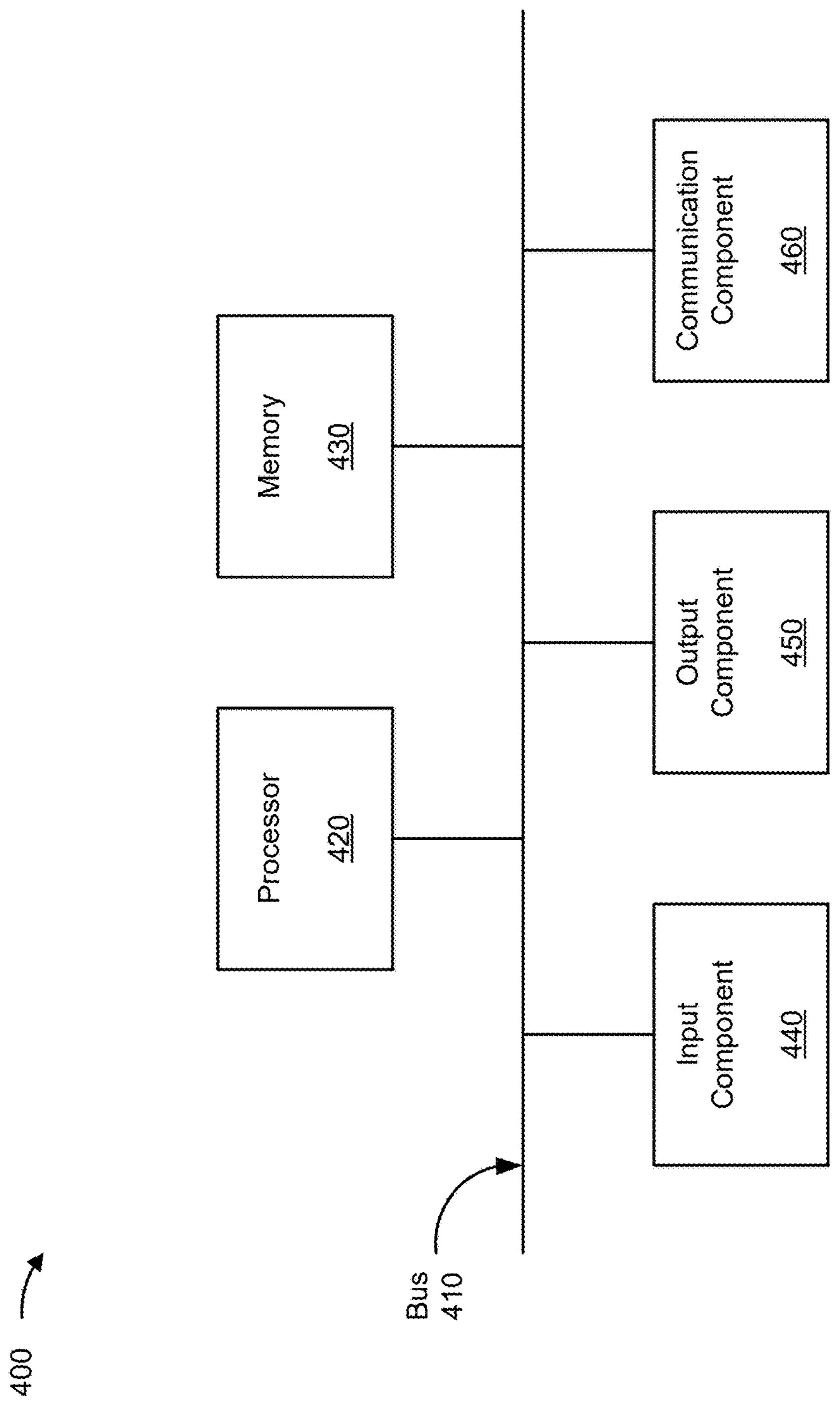
FIG. 4 is a diagram of example components of a device associated with optimizing UE locations in a base station testing system.

FIG. 4 is a diagram of example components of a device 400 associated with optimizing UE locations in a base station testing system. The device 400 may correspond to base station 310 and/or base station testing system 320. In some implementations, base station 310 and/or base station testing system 320 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
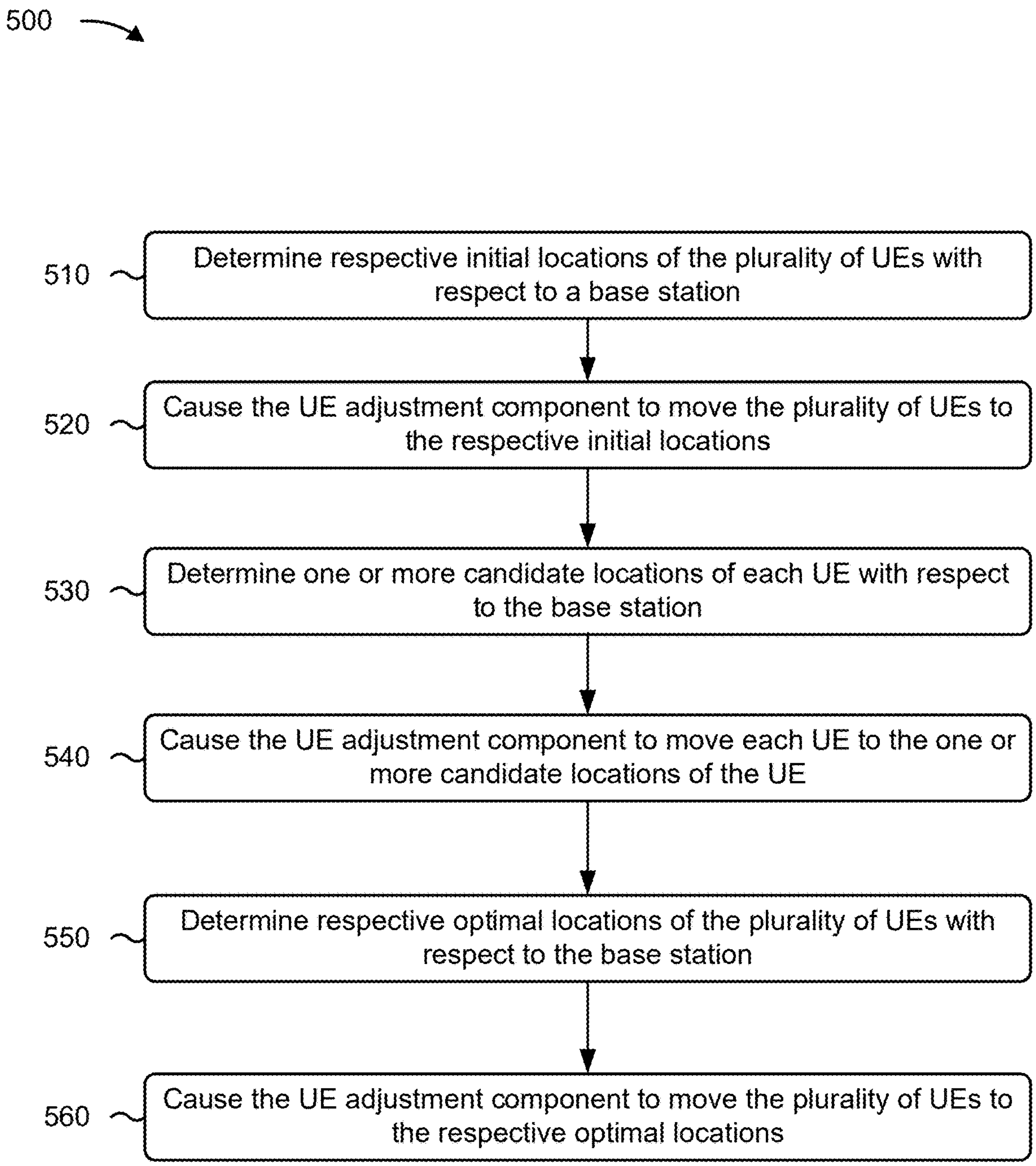
FIG. 5 is a flowchart of an example process associated with optimizing UE locations in a base station testing system.

FIG. 5 is a flowchart of an example process 500 associated with optimizing UE locations in a base station testing system (e.g., base station testing system 320). In some implementations, one or more process blocks of FIG. 5 are performed by the base station testing system and/or one or more components of the base station testing system, such as one or more processors of the base station testing system, a display screen of the base station testing system, a UE adjustment component of the base station testing system, a MIMO channel emulator/simulator of the base station testing system, and/or a plurality of UEs of the base station testing system. In some implementations, one or more process blocks of FIG. 5 are performed by another device or a group of devices separate from or including the base station testing system, such as a base station (e.g., base station 310). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include determining respective initial locations of the plurality of UEs with respect to a base station (block 510). For example, the base station testing system may determine respective initial locations of the plurality of UEs with respect to a base station, as described above.

As further shown in FIG. 5, process 500 may include causing the UE adjustment component to move the plurality of UEs to the respective initial locations (block 520). For example, the base station testing system may cause the UE adjustment component to move the plurality of UEs to the respective initial locations, as described above.

As further shown in FIG. 5, process 500 may include determining one or more candidate locations of each UE with respect to the base station (block 530). For example, the base station testing system may determine, based on the respective initial locations of the plurality of UEs, one or more candidate locations of each UE with respect to the base station, as described above. The base station testing system may determine the one or more candidate locations of each UE with respect to the base station based on the respective initial locations of the plurality of UEs.

As further shown in FIG. 5, process 500 may include causing the UE adjustment component to move each UE to the one or more candidate locations of the UE (block 540). For example, the base station testing system may cause the UE adjustment component to move each UE to the one or more candidate locations of the UE, as described above.

As further shown in FIG. 5, process 500 may include determining respective optimal locations of the plurality of UEs with respect to the base station (block 550). For example, the base station testing system may determine respective optimal locations of the plurality of UEs with respect to the base station, as described above. The base station testing system may determine the respective optimal locations of the plurality of UEs based on causing the UE adjustment component to move the plurality of UEs to the respective initial locations and based on causing the UE adjustment component to move each UE to the one or more candidate locations of the UE.

As further shown in FIG. 5, process 500 may include causing the UE adjustment component to move the plurality of UEs to the respective optimal locations (block 560). For example, the base station testing system may cause the UE adjustment component to move the plurality of UEs to the respective optimal locations, as described above.

Process 500 may include additional implementations, such as any single implementation or any combination of implementations described below and/or in connection with one or more other processes described elsewhere herein.

In a first implementation, the base station is an MU MIMO base station.

In a second implementation, alone or in combination with the first implementation, the base station is a gNodeB base station.

In a third implementation, alone or in combination with one or more of the first and second implementations, process 500 includes determining respective locations of the plurality of UEs that reduce inter-UE interference between the plurality of UEs.

In a fourth implementation, alone or in combination with one or more of the first through third implementations, process 500 includes determining respective locations of the plurality of UEs based on beam patterns of the base station and SINRs associated with the plurality of UEs.

In a fifth implementation, alone or in combination with one or more of the first through fourth implementations, process 500 includes determining, based on causing the UE adjustment component to move the plurality of UEs to respective particular locations with respect to the base station, a performance metric associated with the base station, determining that the performance metric satisfies a performance metric threshold, and identifying the respective particular locations as the respective optimal locations of the plurality of UEs.

In a sixth implementation, alone or in combination with one or more of the first through fifth implementations, process 500 includes obtaining, based on causing the UE adjustment component to move the plurality of UEs to the respective initial locations and based on causing the UE adjustment component to move each UE to the one or more candidate locations of the UE, performance information from at least one of the base station or the plurality of UEs, and determining the respective optimal locations of the plurality of UEs based on the performance information.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A base station testing system, comprising:

a plurality of user equipments (UEs);

a UE adjustment component; and one or more processors configured to:

determine respective initial locations of the plurality of UEs with respect to a base station;

cause the UE adjustment component to move the plurality of UEs to the respective initial locations;

determine, based on the respective initial locations of the plurality of UEs, one or more candidate locations of each UE, of the plurality of UEs, with respect to the base station;

cause the UE adjustment component to move each UE to the one or more candidate locations of the UE;

determine, based on causing the UE adjustment component to move the plurality of UEs to the respective initial locations and based on causing the UE adjustment component to move each UE to the one or more candidate locations of the UE, respective optimal locations of the plurality of UEs with respect to the base station; and cause the UE adjustment component to move the plurality of UEs to the respective optimal locations.

2. The base station testing system of claim 1, wherein the base station is a multi-user (MU) multiple-input multiple-output (MIMO) base station.

3. The base station testing system of claim 1, wherein the base station is a next-generation node B (gNodeB) base station.

4. The base station testing system of claim 1, wherein the one or more processors, to determine the respective initial locations of the plurality of UEs, are configured to:

determine respective locations of the plurality of UEs that reduce inter-UE interference between the plurality of UEs.

5. The base station testing system of claim 1, wherein the one or more processors, to determine the respective initial locations of the plurality of UEs, are configured to:

determine respective locations of the plurality of UEs based on beam patterns of the base station and signal to interference plus noise ratios (SINRs) associated with the plurality of UEs.

6. The base station testing system of claim 1, wherein the one or more processors, to determine the respective optimal locations of the plurality of UEs, are configured to:

determine, based on causing the UE adjustment component to move the plurality of UEs to respective particular locations with respect to the base station, a performance metric associated with the base station;

determine that the performance metric satisfies a performance metric threshold; and identify the respective particular locations as the respective optimal locations of the plurality of UEs.

7. The base station testing system of claim 1, wherein the one or more processors, to determine the respective optimal locations of the plurality of UEs, are configured to:

obtain, based on causing the UE adjustment component to move the plurality of UEs to the respective initial locations and based on causing the UE adjustment component to move each UE to the one or more candidate locations of the UE, performance information from at least one of the base station or the plurality of UEs; and determine the respective optimal locations of the plurality of UEs based on the performance information.

8. A base station testing system, comprising:

a plurality of user equipments (UEs); and one or more processors configured to:

determine respective initial locations of the plurality of UEs with respect to a base station;

cause the plurality of UEs to move to the respective initial locations;

determine, based on the respective initial locations of the plurality of UEs, one or more candidate locations of each UE, of the plurality of UEs, with respect to the base station;

cause each UE to move to the one or more candidate locations of the UE; and determine, based on causing the plurality of UEs to move to the respective initial locations and based on causing each UE to move to the one or more candidate locations of the UE, respective optimal locations of the plurality of UEs with respect to the base station.

9. The base station testing system of claim 8, wherein the one or more processors are further configured to:

cause the plurality of UEs to move to the respective optimal locations.

10. The base station testing system of claim 8, further comprising:

a display screen, wherein the one or more processors are further configured to:

transmit, to the display screen of the base station testing system, location information associated with at least one of the respective initial locations of the plurality of UEs, the one or more candidate locations of each UE, or the respective optimal locations of the plurality of UEs, wherein transmitting the location information causes the display screen to display at least some of the location information.

11. The base station testing system of claim 10, wherein the one or more processors are further configured to:

determine angle domain beam pattern information associated with the base station;

determine, based on the angle domain beam pattern information, spatial frequency domain beam pattern information associated with the base station; and transmit, to the display screen of the base station testing system, the spatial frequency domain beam pattern information, wherein transmitting the spatial frequency domain beam pattern information causes the display screen to display at least some of the spatial frequency domain beam pattern information in association with at least some of the location information.

12. The base station testing system of claim 8, wherein the one or more processors, to determine the respective initial locations of the plurality of UEs, are configured to:

determine the respective initial locations of the plurality of UEs based on inter-UE interference between the plurality of UEs.

13. The base station testing system of claim 8, wherein the one or more processors, to determine the respective initial locations of the plurality of UEs, are configured to:

determine the respective initial locations of the plurality of UEs based on beam patterns of the base station.

14. The base station testing system of claim 8, wherein the one or more processors, to determine the respective optimal locations of the plurality of UEs, are configured to:

determine, based on causing the plurality of UEs to move to respective particular locations with respect to the base station, a performance metric associated with the base station;

determine that the performance metric satisfies a performance metric threshold; and identify the respective particular locations as the respective optimal locations of the plurality of UEs.

15. The base station testing system of claim 8, wherein the one or more processors, to determine the respective optimal locations of the plurality of UEs, are configured to:

obtain performance information from at least one of the base station or the plurality of UEs; and determine the respective optimal locations of the plurality of UEs based on the performance information.

16. A method, comprising:

determining, by a base station testing system, respective initial locations of a plurality of user equipments (UEs) with respect to a base station;

causing, by the base station testing system, the plurality of UEs to move to the respective initial locations;

causing, by the base station testing system, each UE, of the plurality of UEs, to move to one or more candidate locations of the UE with respect to the base station; and determining, by the base station testing system, based on causing the plurality of UEs to move to the respective initial locations, and based on causing each UE to move to the one or more candidate locations of the UE, respective optimal locations of the plurality of UEs with respect to the base station.

17. The method of claim 16, further comprising:

causing the plurality of UEs to move to the respective optimal locations.

18. The method of claim 16, further comprising:

transmitting location information associated with at least one of the respective initial locations of the plurality of UEs, the one or more candidate locations of each UE, or the respective optimal locations of the plurality of UEs, wherein transmitting the location information allows at least some of the location information to be displayed on a display screen.

19. The method of claim 16, wherein determining the respective initial locations of the plurality of UEs comprises:

determining the respective initial locations of the plurality of UEs based on at least one of inter-UE interference between the plurality of UEs or beam patterns of the base station.

20. The method of claim 16, wherein determining the respective optimal locations of the plurality of UEs comprises:

determining the respective optimal locations of the plurality of UEs based on performance information obtained from at least one of the base station or the plurality of UEs.

* * * * *